United States Patent [19]

Thor

[11] Patent Number: 4,779,112

[45] Date of Patent: Oct. 18, 1988

[54] AUTOMATIC, SHEET-FEEDING FILM HOLDER FOR CAMERAS

[76] Inventor: Adrian J. Thor, 565 Archwood Ct., Brea, Calif. 92621

[21] Appl. No.: 53,117

[22] Filed: May 21, 1987

[51] Int. Cl.⁴ .............................................. G03B 19/10
[52] U.S. Cl. .................................... 354/174; 354/212; 271/4
[58] Field of Search ............... 354/174, 178, 179, 180, 354/181, 182, 212; 271/4

[56] References Cited

U.S. PATENT DOCUMENTS

| | | | |
|---|---|---|---|
| 3,653,309 | 4/1972 | Ochiai | 354/181 |
| 4,047,209 | 9/1977 | Groeneweg | 354/212 |
| 4,206,989 | 6/1980 | Hahn et al. | 354/182 |

FOREIGN PATENT DOCUMENTS 2050370 4/1972 Fed. Rep. of Germany .......... 271/4

Primary Examiner—A. A. Mathews
Attorney, Agent, or Firm—Ashen Golant Martin & Seldon

[57] ABSTRACT

An automatic, sheet-feeding photographic film-holding apparatus that can be attached to or inserted into a processing area, such as a camera or enlarger, having the means to hold a plurality of semi-flexible material, such as photographic sheet film, both before and after processing, such as exposure; the means to feed a sheet from a stack of sheets, one by one, into a processing area; and to retrieve and store that sheet, while feeding the next sheet into the processing area.

18 Claims, 5 Drawing Sheets

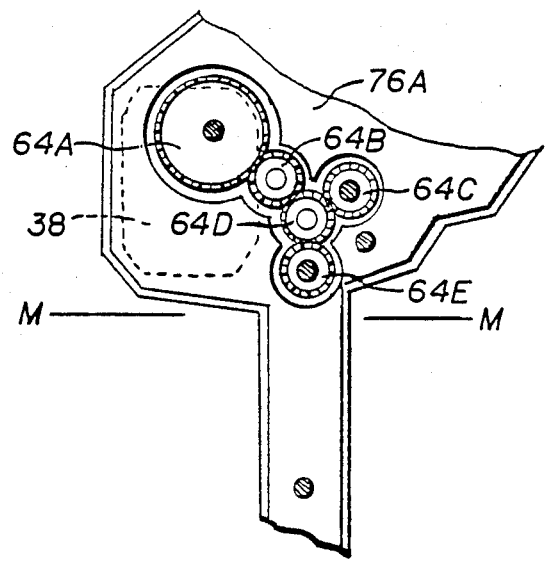
FIG. 4
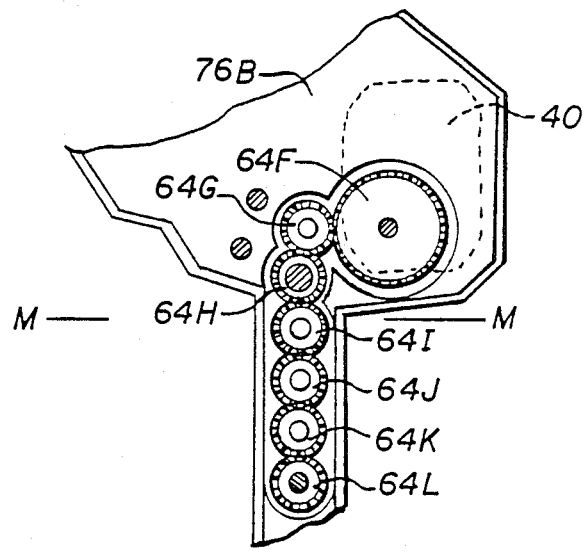
FIG. 5
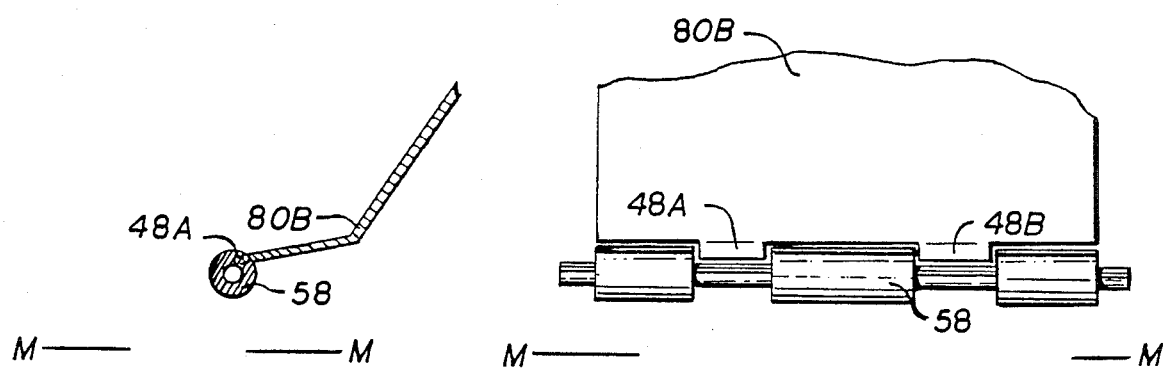
FIG. 6
FIG. 7

AUTOMATIC, SHEET-FEEDING FILM HOLDER FOR CAMERAS

BACKGROUND

1. Technical Field

This invention relates to photography and photographic sheet film and, in particular, to the holding, feeding, retrieving and storing of photographic film in a sheet format as it is used in a large format camera.

The term, large format, relates to cameras that use large-size sheet film, 4"×5" and larger. It is well known in the art that the large format camera offers maximum versatility and many other special features that allow greater flexibility in creative control and, in addition the large-size film produces better quality, less graininess and a much greater range of tonal values. However, another characteristic of the large format camera and not a desireable one is that a single sheet of film, one at a time, must be inserted into the camera for each exposure and then the sheet of film must be removed before the next sheet of film can be inserted. Further, during this time-consuming process, the sheet of film must be protected from light.

2. Prior Art

Known photographic sheet film-handling devices for the large format camera are individual film holders that require not only tedious preparation, loading and unloading of individual sheets of film both before and after use, but an additional time-consuming procedure is necessary in bringing each sheet of film to and from an exposure position or focal plane even after the sheet is inserted into the camera.

There are a number of these types of film-holding devices on the market with slight variations. One representative device is Film Holder, U.S. Pat. No. 2,496,271. This device holds two sheets of film, and prior to insertion in the camera, these two sheets must be individually placed in the film holder in a light-tight environment.

The loading procedure is as follows: In a light-tight environment, the first sheet of film is placed in the film holder and then covered with a light-blocking slide. The holder is then turned over, the second sheet is placed on the opposite side, and the second sheet is covered with a light-blocking slide. If the photographer plans to shoot more than two sheets of film. he must fill additional film holders in this same manner or, after exposing those two sheets, return to the light-tight environment to re-fill the original holder.

The picture-taking procedure is as follows: Once the two sheets are placed in the holder, the film holder must then be inserted into the focal plane of the camera, the light-blocking slide removed from the camera, and the sheet of film exposed. After exposure, the light-blocking slide is replaced and the film holder is removed from the camera. The holder is then turned over, after which it is again inserted into the focal plane and the second sheet is exposed and the process is repeated.

To use a third sheet or more, as previously stated, additional film holders would have to be prepared in advance or the photographer would have to return to the light-tight environment and un-load and re-fill the original film holder.

Heretofore, this tedious and time-consuming method of loading and unloading individual sheets of film has long plagued the large format camera user. Therefore, fashion photographers and others needing the ability to shoot a large amount of film in a short period of time have had to turn to the smaller format camera to get the speed and quantity they needed.

While the time and tediousness of the single sheet loading method is reason enough for an improvement in the state of the art, the convenience of having multiple sheets of film available at hand and the ability to shoot another sheet of film immediately is wanted and needed by the large format camera photographer.

SUMMARY OF THE INVENTION

It is the objective of this invention to eliminate the aforementioned disadvantages and to provide an automatic, sheet-feeding photographic film-holding apparatus having the means to hold a plurality of photographic sheet film, both before and after processing, such as exposing or enlarging; that can be inserted into or attached to a processing means, such as a camera; having the means to feed a sheet from a stack of sheets, one by one, into a processing area and retrieve the sheet, while feeding the next sheet into the processing area.

In a preferred embodiment of this invention, a further objective is to provide a method and an apparatus that will allow the large format camera photographer the speed, convenience and flexibility necessary to shoot numerous sheets of film in a minimum amount of time.

In achieving the foregoing objective, this invention can be inserted into the focal plane or exposure position of a large format camera and it can hold a plurality (50) of sheets of film and can provide a light-tight compartment while being used, as well as both before and after exposure.

In addition, this invention automatically feeds sheet film from a stack, one by one, into the focal plane for exposing and after exposure retrieves the sheet of film, while feeding the next sheet of film into the focal plane of the camera.

Further, this invention is designed to provide minimum amount of interference with the movements of the camera.

Further, this invention provides a compact, light-tight film-holding accessory that can be easily transported.

This invention will become better understood and further objectives and advantages will become apparent from the following detailed description, especially when taken in light of accompanying drawings wherein:

BRIEF DESCRIPTION OF THE DRAWINGS

FIG. 4 is a fragmentary, right-side vertical view taken partially above and partially below the line-M of FIG. 1 and with the cover plate removed; and FIG. 5 is a fragmentary, left-side vertical view taken partially above and partially below the line-M of FIG. 1 and with the cover plate removed; and FIG. 6 is a detailed, vertical cross-sectional view showing the relationship between the pick-up fingers and the idler roller; and FIG. 7 is a front view of FIG. 6.

REFERENCE NUMBERS

Figure 1:
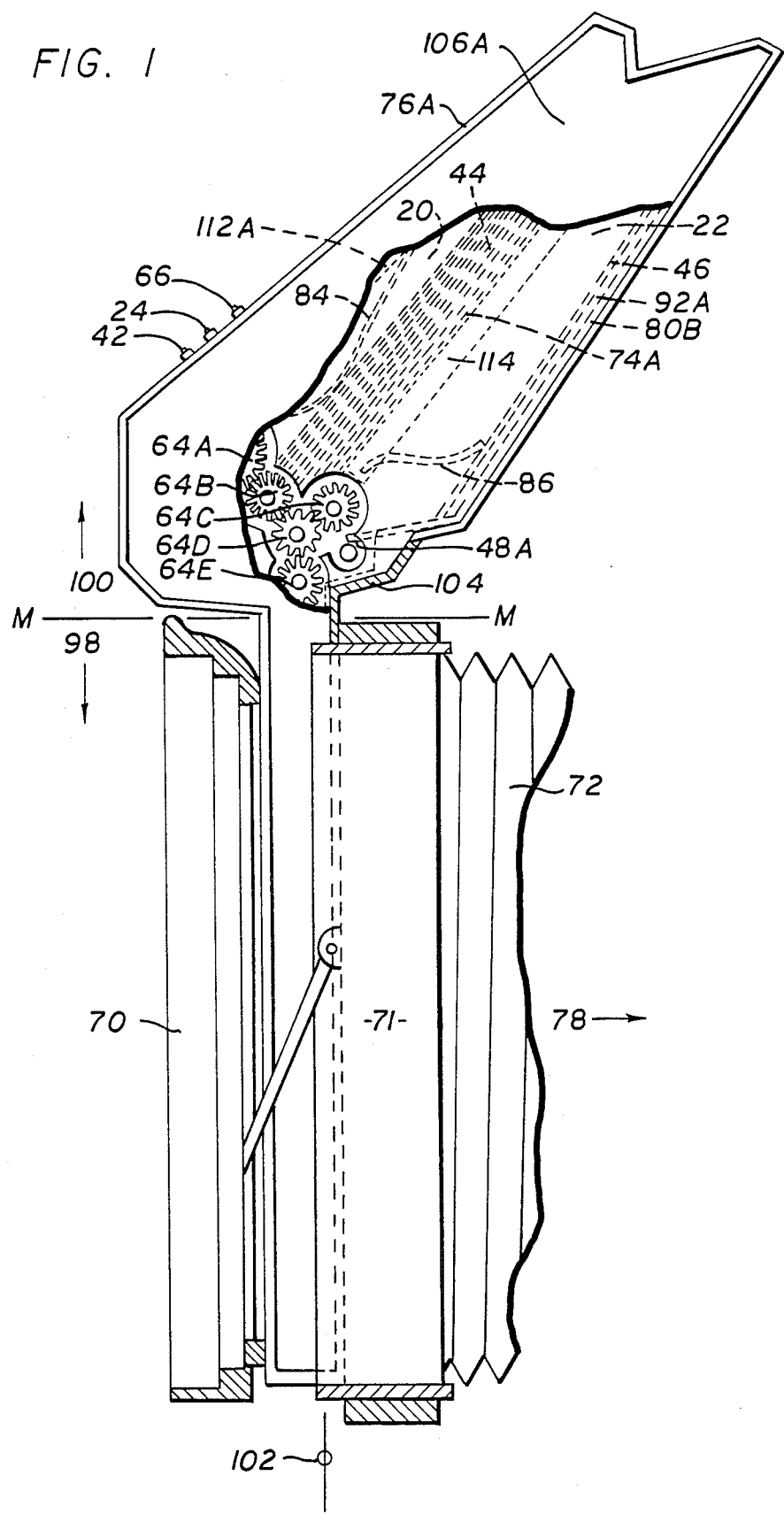
FIG. 1 is a right-side, vertical view of the preferred embodiment of the apparatus shown with a portion of the cover plate being cut-away and shown inserted into the focal plane or exposure position of a large format camera.

20: unexposed film compartment
22: exposed film compartment
24: load button
28: pick-up roller
32: advance roller
36: feeder roller
38: 1st drive mechanism
40: 2nd drive mechanism
42: unload lever
44: stack of unexposed film
46: stack of exposed film
48: pick-up fingers
52: upper switch
54: lower switch
56: spring return
58: idler roller
60: motor compartment
62: electronics cmprtmt
64: gears
66: cycle button
68: unload bar
70: camera back frame
71: camera back carrier
72: camera back bellows
74: stack support rails (unexposed cmprtmt)
76: uprights
78: towards camera lens
80: housing
82: interlocking grooves
84: tension spring (unexposed cmprtmt)
86: tension spring (exposed cmprtmt)
88: access door (unexposed cmprtmt)
90: light trapping baffle
92: stack support rails (exposed cmprtmt)
94: rim edges
96: access door (exposed cmprtmt)
98: lower portion
100: upper portion
102: focal plane
104: maintenance door
106: cover plate
112: inner housing wall
114: inner housing partition
118: bottom cover.

DETAILED DESCRIPTION OF DRAWINGS

The invention will now be described by reference to a preferred embodiment of the automatic, sheet-feeding film holder for cameras. Referring particularly to FIG. 1, the apparatus is shown as it would be used in a large format camera.

The apparatus has a upper portion 100 FIG. 1 and a lower portion 98 FIG. 1. The lower portion 98 is inserted into the camera back at the focal plane 102, which is located between the frame 70 and the carrier 71, which is attached to the bellows 72 of the camera. The directional arrow 78 points frontward, towards the lens of the camera.

The line-M is a delineation between the upper portion 100 and the lower portion 98 and is approximately at the point remaining outside of the camera when the apparatus is inserted into the focal plane 102 of the camera back.

The outer cover of the upper portion 100 FIG. 1 of the apparatus consists of the two uprights, 76A and 76B (not shown), two side cover plates 106A and 106B (not shown). At the top of the apparatus are two access doors (shown open) 88 and 96 FIG. 3 and the two housing walls 80A and 80B.

The outer cover of the lower portion 98 of the apparatus consists of the buttress 26, the bottom cover 118, the two uprights 76A (not shown) and 76B, the rim edges 94B (not shown), 94A, 94C and 94D and the maintenance door 104.

Upper Portion

Figure 3:
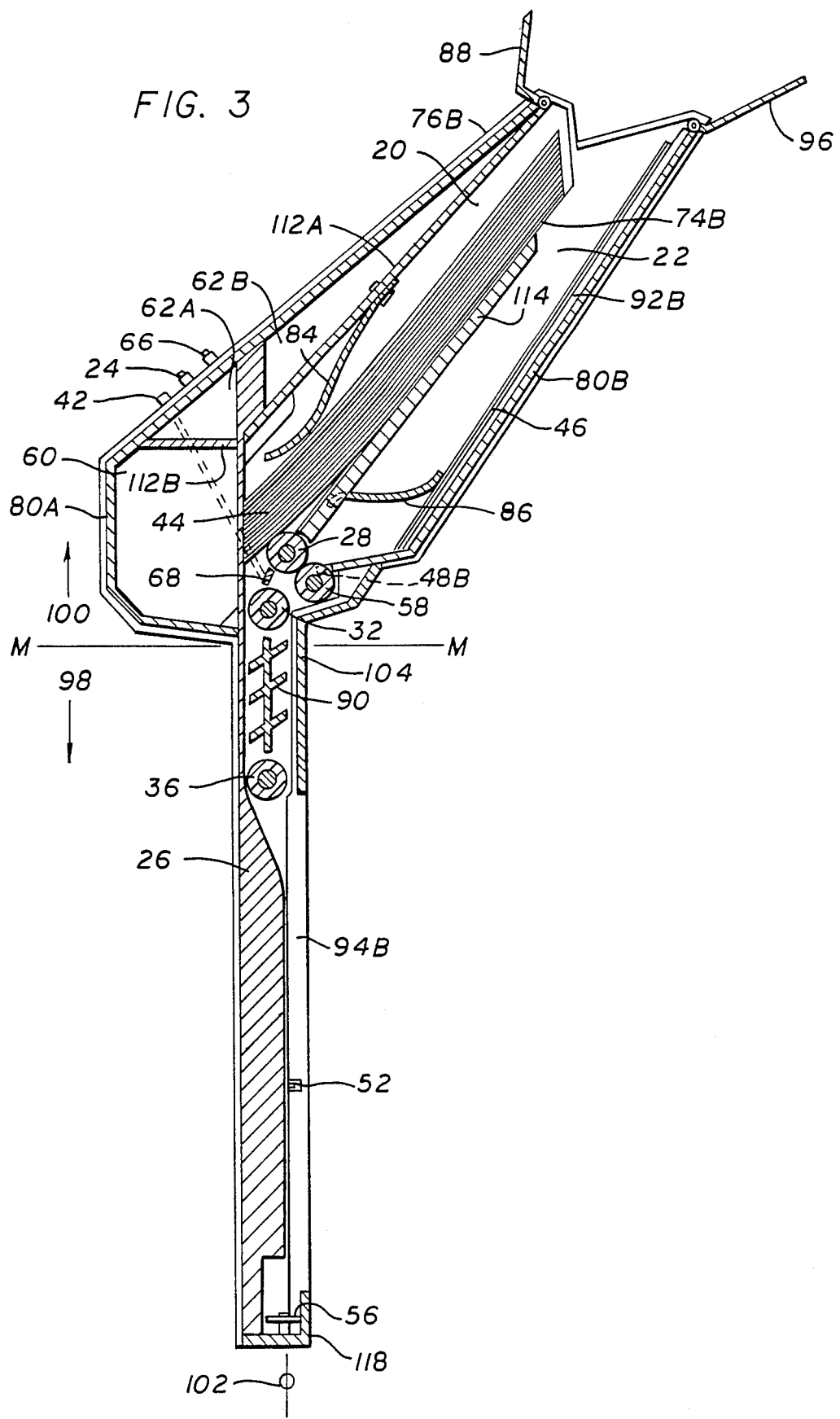
FIG. 3 is a right-side, vertical cross-sectional view taken substantially along line A—A of FIG. 2.

The inner spaces of the upper portion 100 FIG. 3 of the apparatus has four compartments, 20, 22, 60, and 62A and B. The two light-tight access doors 88 and 96 (shown open) provide access to the film compartments 20 and 22. The stack support rails 74A (not shown) and 74B, the inner housing parition 114, the pick-up roller 28, the unload bar 68, and the advance roller 32 form a division between the unexposed film compartment 20 and the exposed film compartment 22 FIG. 3 with the stack support rails 74A (not shown) and 74B actually supporting the stack of unexposed film 44. A access door 88 provides access into the unexposed film compartment 20 for the purpose of loading unexposed sheets of film and another access door 96 provides access into the exposed film compartment 22 for the purpose of unloading exposed sheets of film.

In the unexposed film compartment 20 FIG. 3, one end of a tension spring 84 is attached to the mid-section of the inner housing wall 112A. The buttress 26 is connected to the two uprights 76A (not shown) and 76B. The two stack support rails 74A (not shown) and 74B, the pick-up roller 28 and the buttress 26 form a wedge.

In the exposed film compartment 22 FIG. 3, the stack of exposed film 46 rests on two stack support rails 92A (not shown) and 92B. One end of a tension spring 86 is attached to the lowermost end of the inner housing partition 114.

Figure 2:
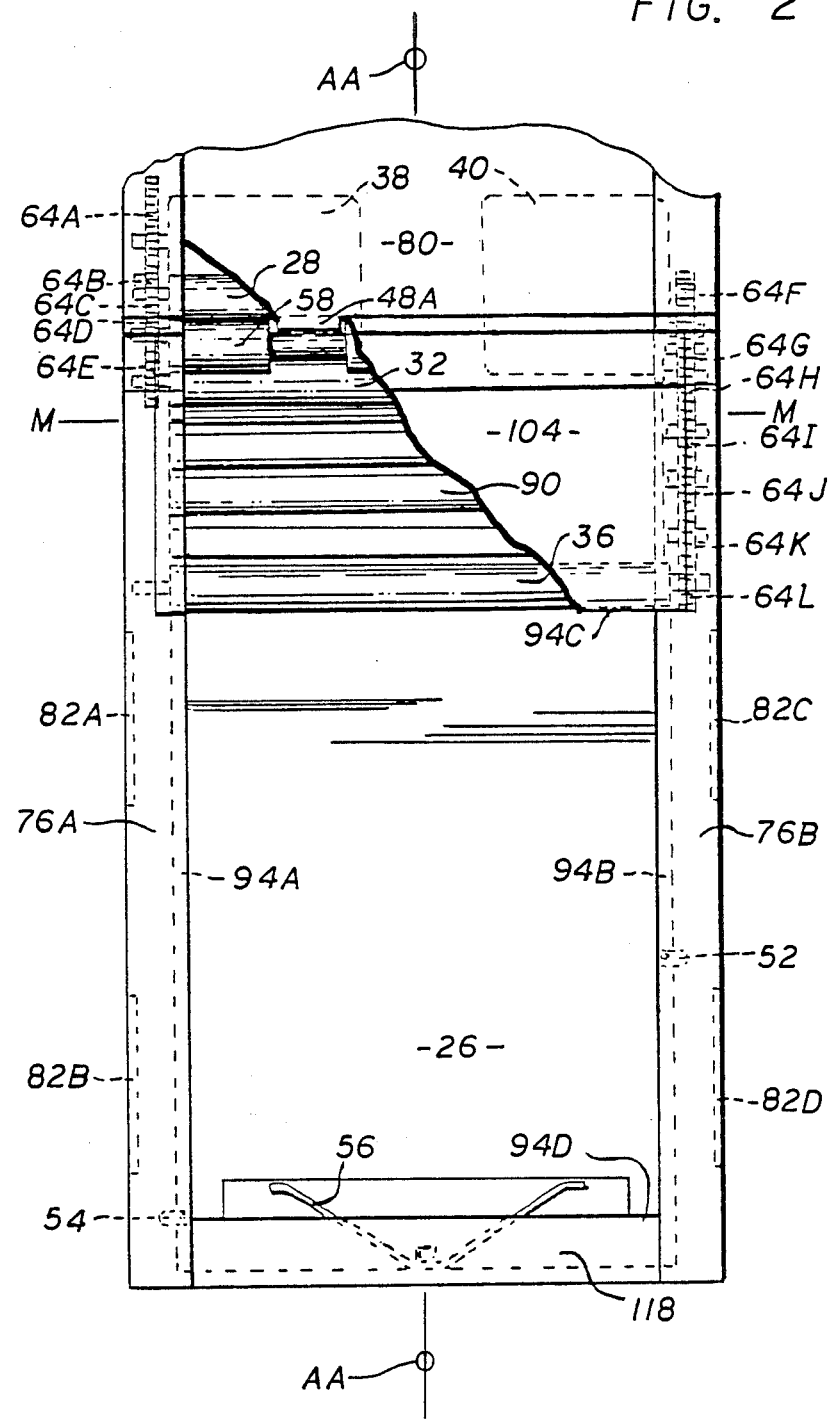
FIG. 2 is a fragmentary, front view of the apparatus with a portion of the housing and maintenance door being cut-away.

The motor compartment 60 FIG. 3, including the drive mechanisms 38 and 40 FIG. 2, is housed in the upper portion 100 FIG. 3 of the apparatus, in back of the unexposed film compartment 20. The electronics compartment 60A and B is located above the motor compartment 60. The inner housing wall 112B divide the motor compartment 60 and the electronics compartment 62A, and the inner housing wall 112A divides the electronics compartment 62B and the unexposed film compartment 20.

The drive mechanisms 38 and 40 FIG. 2 and their gears 64A-E and 64F-L are located in the area partially above and partially below the line M FIGS. 2 and 4. Located in the right side of the apparatus FIGS. 2 and 4, the gear 64A is affixed to the drive mechanism 38, the gear 64C is affixed to the pick-up roller 28, the gear 64E is affixed to the advance roller 32, and the gears 64B and 64D are means of transferring energy. Located in the left side of the apparatus FIGS. 2 and 5, the gear 64F is affixed to the drive mechanisms 40, the gear 64L is affixed to the feeder roller 36 and the gear 64H spins free around the advance roller 32. The gears 64G and 64I-K are means of transferring energy.

Located in the lowermost section of the upper portion 100 FIG. 3 are the pick-up roller 28, the idler roller 58 and the two pick-up fingers 48A (not shown) and 48B. Both pick-up fingers 48A and 48B and the idler roller 58 are shown in detail in FIGS. 6 and 7. Between the pick-up roller 28 and the advance roller 32 is the unload bar 68, which is activated by the unload lever 42.

Lower Portion

In the uppermost section of the lower portion 98 FIG. 3 of the apparatus, the light-trapping baffle 90 is located below the advance roller 32, in front of the buttress 26 and above the feeder roller 36. It is at approximately this point, that the buttress curves in such a way as to cause the sheet of film as it moves down the transport path to come in line with the focal plane 102 of the camera. At this point, the two uprights 76A (not shown) and 76B form the rim edges 94A (not shown) and 94B of the opening or focal plane 102. This opening is formed by the two vertically arranged rim edges 94A and 94B FIG. 2 and the two horizontally-arranged rim edges 94C and 94D. Rim edge 94C is formed by the maintenance access door 104 and rim edge 94D is formed by the bottom cover 118.

Located approximately in the mid-point of the lower portion is the upper switch 52, which controls the pick-up roller 28 and the advance roller 32. Below the upper switch 52 is the lower switch 54, which activates the feeder roller 36. In the same area, the return spring 56 is connected to the bottom cover 118. Also in this lower portion are four interlocking grooves 82A-C FIG. 2.

HOW IT WORKS

Referring particularly to a preferred embodiment of the invention, the method and operation of an automatic sheet-feeding film holder for large format cameras will be described including: loading a stack of unexposed film in a first holding compartment, inserting the apparatus into the camera back, the feeding of a sheet to an exposure position in the focal plane of the camera, the retrieving of said sheet after exposure, storing of the sheet in a second holding compartment, the removal of the apparatus from the camera and the unloading of the stack of exposed film.

Light Tight

An important and necessary aspect of the apparatus is the means of providing a light-tight container for the photographic sheet film at all times.

Such a light-tight container is provided by the outer covering of the apparatus in the upper portion 100 FIG. 1 when it is outside of the camera back and the sheet film is in film compartment 20 and 22, and the access doors 88 and 96 are closed FIG. 3 (doors shown open). When the apparatus is in the camera back, the outer covering of the upper portion 100 and the outer covering of the lower portion 98 in conjunction with the camera back provides a light-tight container.

The outer covering of the upper portion 100 FIG. 1 consists of: the outer housing 80A (not shown) and 80B, the two uprights 76A and 76B (not shown), the two side covers 106A and 106B (not shown), the two access doors 88 and 96 (shown open) FIG. 3 and the maintenance door 104 FIG. 1. As previously stated this outer covering provides a light-tight environment for holding both unexposed and exposed film sheets.

The outer covering of the lower portion 98 FIG. 3 of the apparatus consists of the buttress 26, the bottom plate 118, the rim edges 94A and 94B (both shown in FIG. 2), the maintenance door 104 and the lower portion of two side covers 106A FIG. 1 and 106B (not shown). As previously stated, this outer covering in conjunction with the camera back and the outer covering of the upper portion 100 provides a light-tight environment for the sheet film during the feeding, exposing and retrieving process.

Four interlocking grooves 82A-D FIG. 2 match the international locking system for large format cameras and are used when the apparatus is in the camera.

Loading a Stack of Film

In a light-tight environment, a stack of a multiple (50) of unexposed sheet film 44 FIG. 3 is placed in the unexposed film compartment 20 by way of the access doors 88 and 96. Once the access doors 88 and 96 are closed, a light-tight holding compartment is created, whereby sheets of film can be stored for an indeterminate length of time or until inserted into camera back and processed. The access doors 88 and 96 are constructed in such a way as to allow exposed sheets of film 46 to be removed from the exposed film compartment 22 without disturbing the unexposed sheets of film 44. The apparatus is then inserted into the focal plane 102 FIG. 1, located between the frame 70 and the carrier 71, adjacent to the bellows 72 of the camera. The apparatus is now light-safe for operation.

Sheet-feeding into the focal plane

The unexposed film compartment 20 FIG. 3 is separated from the exposed film compartment 22 by the inner housing partition 114, and is holding the stack of unexposed sheets of film 44 with only the outer edge of two sides of the sheets resting on the stack support rails 74A (not shown) and 74B and the buttress 26 are arranged in such a way as to cause the stack of unexposed sheets of film 44 to be slightly wedged between the stack support rails 74A (not shown) and 74B and the buttress 26 FIG. 3.

A tension spring 84 is attached to the mid-section of the inner housing partition 112A and is applying pressure to the stack of unexposed sheets of film 44. This wedging keeps all of the sheets in the stack 44 inflexible, except the lower portion of the bottommost sheet between the buttress 26 and the pick-up roller 28.

Figure 8:
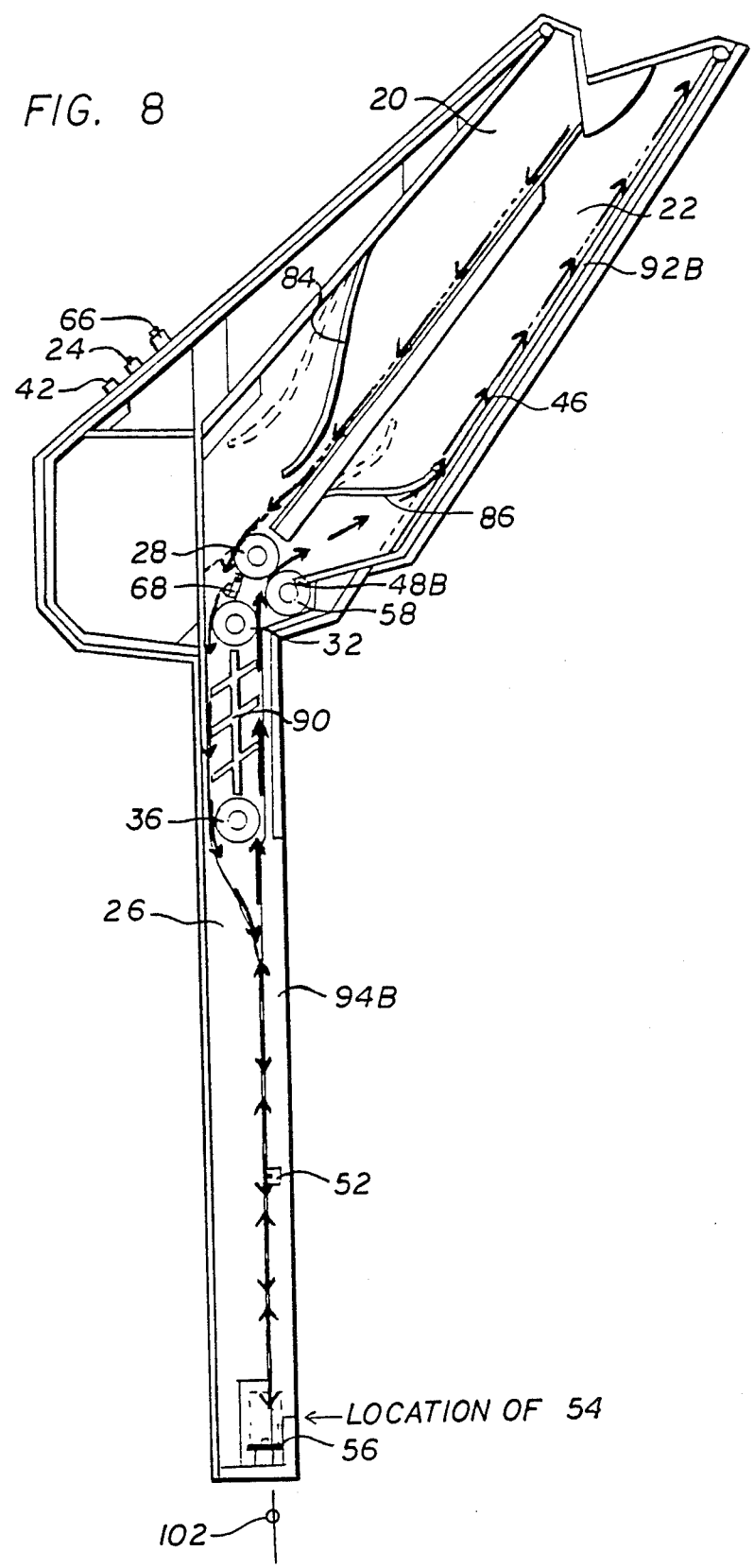
FIG. 8 is a right-side, cross-sectional view taken substantially along the line A—A of FIG. 2 showing sheet movement within the transport path with directional arrows showing the direction the sheet travels.

To begin the operation, the load button 24 FIG. 8 is depressed and this activates the pick-up roller 28, the advance roller 32, and the feeder roller 36 FIG. 8. The pickup roller 28 separates the bottommost sheet, causing it to be slightly bowed as it is conveyed toward the advance roller 32, which assists in the separating process. The spacing between the advance roller 32 and the buttress 26 provides a minimal amount of surface contact with the buttress 26. The spacing plus the bowing of the sheet maintains sufficient friction with the advance roller 32 to transport the sheet past the light-trapping baffle 90 towards the feeder roller 36.

At this time, the bottom edge of the sheet has reached the feeder roller 36. At this point the buttress 26 curves in such a way as to cause the sheet to bow and to come in line with the focal plane 102 FIG. 8 as it moves down. The spacing plus the further bowing of the sheet maintains sufficient friction with the feeder roller 36 to transport the sheet down the transport path and into the focal plane 102 FIG. 8.

At this time, the top edge of the sheet is now leaving the pick-up roller 28 and the bottom edge of the sheet has progressed to the upper switch 52, which automatically turns off the pick-up roller 28 and the advance roller 32 and prevents the next sheet from being fed out of the unexposed film compartment 20.

The feeder roller 36 continues to feed the sheet toward the lower switch 54 FIG. 8. However, before reaching the lower switch 54, the bottom sheet comes in contact with the return spring 56, FIG. 2, which applies pressure on the bottom edge of the sheet in the opposite direction of its travel, causing the top edge of the sheet to stay in contact with the surface of the feeder roller 36. When the bottom edge of the sheet reaches the lower switch 54, it automatically turns off the feeder roller 36. The backward pressure of the return spring 56 then causes the top edge of the sheet to be slightly pinched between the feeder roller 36 and the rim edge 94C FIG. 2.

In the focal plane

The sheet of film is now in the focal plane 102 of the camera and ready for exposure.

Retrieving and storing

Once the sheet of film has been exposed, the sheet is ready to be retrieved from the focal plane 102 FIG. 8 and stored in the exposed film compartment until it is unloaded.

As previously stated, the sheet as it is in the focal plane 102 FIG. 8 has a slight pressure being applied by the return spring 56, which causes the top edge of the sheet to be slightly pinched between the feeder roller and the rim edge 94C, causing the sheet to be receptive to the following action: the cycle button 66 FIG. 8 is depressed and this activates the feeder roller to pull the bottom edge of the sheet past the lower switch 54, which automatically takes over the control of the feeder roller 36 and the retrieval process has begun. NOTE: All rollers turn in the same direction at all times.

The sheet of film continues to be fed by the feeder roller 36 towards the light-trapping baffle 90 FIG. 8 and the advance roller 32. When the top edge of the sheet is between the pick-up roller 28 and the advance roller 32 and the bottome edge of the sheet passes the upper switch 52, the following events occur: the upper switch 52 activates the pick-up roller 28 and the advance roller 32. The pick-up roller 28 separates the next sheet from the stack of sheets in the unexposed film compartment 20 starting it down its transport path. Simultaneously, the pick-up roller 28 and the advance roller 32 are pulling the exposed sheet into the exposed film compartment 22 FIG. 8. NOTE: Because the distance from the unexposed film compartment 20 to the focal plane 102 is longer than the distance from the focal plane 102 to the exposed film compartment 22, the first sheet is off-loaded before the next sheet reaches the focal plane 102.

The idler roller 58 and the pick-up roller 28 directs the exposed sheet into the exposed film compartment 22 and the tension spring 86 applies pressure to the stack causing the in-coming sheet to come to rest on top of the previous sheet in the stack 46, which rests on stack support rails 92A (not shown) and 92B FIG. 8. Pick-up fingers 48A (not shown) and 48B (shown in detail in FIG. 7) keep the bottom edge of the sheet from fouling with the next in-coming sheet.

This cycle of feeding and retrieving can be repeated up to 50 times without removing the apparatus from the camera for reloading.

Removing and Interrupting

In preparing for the removal of the apparatus from the camera back or for interrupting the feeding and retrieving process for any reason, the procedure is as follows: the unload lever 42 is depressed, which causes the unload lever bar 68 to raise the stack of unexposed sheets of film off of the pick-up roller 28, which prevents the next sheet from being fed; while allowing the retrieval of the last sheet exposed to continue into the exposed film compartment 22. This retrieval is activated by depressing the cycle button 66. Once the retrieval cycle is complete, the apparatus can be removed from the camera back or if it is an interruption only, the cycle begins again, once the load button is depressed.

Automatic Controls

The upper switch 52 FIG. 2 automatically controls the pick-up roller 28 and the advance roller 32 and the lower switch 54 automatically controls the feeder roller. Both switches are turned off and on when a light beam located at the switch points is broken when the top or bottom of the sheet of film reaches that point in the transport path.

Manual Controls

The load button 24 FIG. 3 is used only for starting the first sheet of film into the feeding process. The unload lever 42 FIG. 3 is used only to stop the feeding of the next sheet of film. The cycle button 66 FIG. 3 is only to begin the retrieval process.

Drive Mechanisms, gears, electronics

The positions of the drive mechanisms, gears, rollers and switches are shown in FIG. 2 and the drive mechanisms and gears are also shown in FIGS. 4 and 5.

The upper switch 52 FIG. 2 activates the drive mechanism 38 which is connected to the pick-up roller 28 and the advance roller 32, and the gear 64A is affixed to the drive mechanism 38, the gear 64C is affixed to pick-up roller 28, and the gear 64E is affixed to the advance roller 32. The lower switch 54 FIG. 2 activates the drive mechanism 40 which is connected to the feeder roller 36, the gear 64F is affixed to the drive mechanism 40, the gear 64L is affixed to the feeder roller 36, the gear 64H spins free around the advance roller 32 FIG. 2, while the gears 64B, 64D, 64G, 64I, 64J and 64K are means of transferring energy.

The motor compartment 60 FIG. 3 and the electronics compartment are divided by the inner housing wall 112B. The electronics compartment 62B and the unexposed film compartment 20 FIG. 3 are divided by the inner housing wall 112A.

Conclusion

This invention, an automatic, sheet-feeding filmholding apparatus, not only eliminates the disadvantages of the prior art, but offers many new advantages such as: up to 50 sheets of film in a compact, attachable container, close at hand and ready for use. In addition, the sheets can be fed into the processing area and retrieved, while another sheet is being fed, at approximately one per second, giving the user the speed, convenience and flexibility, heretofore not possible.

Within the scope of the preferred embodiment, an automatic, sheet-feeding film holder for a large format camera, there are a number of additions possible, such as: a film counter, two hand cranks that could replace motors, a buzzer and a light to indicate when the film is in the focal plane, and for the camera with an electronic shutter, a switch that automatically fires the shutter when the sheet of film reaches the focal plane.

While the forms of the apparatus herein described constitute a preferred embodiment of this invention it is to be understood that the invention is not limited to these precise fomrs, and that changes may be made therein without departing from the scope of the invention. For example: by replacing the lower portion of the buttress with glass, the apparatus could be used with an enlarger or with a viewer for film or microfiche. These adaptions would provide a fast, convenient method for processing large quantities of photographic sheet film in a clean, compact environment.

While the above descriptions contain many specificities, it should not be construed that these are limitations on the scope of the invention, but merely as exemplifications of the invention thereof. Those in the art will envision many other possible variations and additions within its scope. For example the location of the compartments and the transport path could be rearranged or modified to fit other camera designs as well as other processing units. In fact, this apparatus would be adaptable to any type of processing of any type of semi-flexible material in a sheet format.

I claim:

1. An automatic sheet-feeding and -retrieving film-holder accessory, for use with an existing large-format camera which has a back-receiving portion configured to receive and engage a standard sheet-film-holding back module, and which camera is particularly adapted for swing and tilt operation; said accessory also being for use with a stack of photographic sheet film sized for such a camera; said accessory comprising:
   mounting means particularly sized and adapted for engaging the back-receiving portion of such existing camera, in place of such a standard back module;
   supply means for holding a stack of sheets of unexposed film;
   receiving means for holding a stack of sheets of exposed film;
   focal-plane means for holding a single sheet of film in position for exposure by such camera;
   both the supply means and the receiving means being disposed in common above the focal-plane means;
   whereby, when the accessory mounting means engage the back-receiving portion of such camera, the accessory leaves the camera free to undergo such swings and tilts without interference;
   first drive means for moving a sheet of such unexposed film from the supply means along a supply path to the focal-plane means; and
   second drive means for moving a sheet of such exposed film from the focal-plane means along a retrieval path to the receiving means.

2. The accessory of claim 1, wherein:
   the first and second drive means have at least one common sheet-driving roller which, when operating, always rotates in the same direction.

3. The accessory of claim 1, wherein:
   the first and second drive means have at least one common sheet-driving roller which is mounted stationarily for rotation.

4. The accessory of claim 1, wherein:
   the first and second drive means have at least one common sheet-driving roller which is mounted stationarily for rotation, and which drives an unexposed sheet along one side of the common roller and an exposed sheet along an opposite side of the common roller.

5. The accessory of claim 1, wherein:
   the first and second drive means have at least one common sheet-driving roller which feeds one sheet of unexposed film along the supply path and another sheet of exposed film along the retrieval path, simultaneously.

6. The accessory of claim 1, wherein:
   the first and second drive means have at least one common sheet-driving roller which is mounted stationarily for rotation, always in the same direction, and which drives an unexposed sheet along the supply path at one side of the common roller and an exposed sheet along the retrieval path at an opposite side of the common roller, simultaneously.

7. The accessory of claim 1, wherein:
   the first and second drive means have at least two common sheet-driving rollers, each mounted stationarily for rotation, always in the same direction; and
   the sheet-driving rollers drive an unexposed sheet along the supply path at one side of the common rollers and an exposed sheet along the retrieval path at an opposite side of the common rollers, simultaneously.

8. The accessory of claim 1, wherein:
   the first and second drive means have at least one common sheet-driving roller which is mounted stationarily for rotation, always in the same direction, and which drives an unexposed sheet along the supply path at one side of the common roller and an exposed sheet along the retrieval path at an opposite side of the common roller.

9. The accessory of claim 8, wherein the common roller is:
   mounted immediately adjacent to the top of the focal-plane means;
   disposed to drive the trailing edge of each unexposed sheet of film along the supply-path side of the common roller and into the focal-plane means, by rotation in said direction;
   disposed to transfer the edge of each sheet of film that is held in the focal-plane means from the supply-path side of the common roller to the retrieval-path side of the common roller, by rotation in said same direction;
   whereby said trailing edge becomes the leading edge of each sheet of exposed film; and
   disposed to start the leading edge of each sheet of exposed film along the retrieval-path side of the common roller, by rotation in said some direction.

10. The accessory of claim 9, further comprising spring means disposed adjacent to the bottom of the focal-plane means, for:
    compliantly receiving the leading edge of each sheet of unexposed film downward, so that the trailing edge of that unexposed sheet can clear the common roller while that trailing edge is being transferred from the supply-path side of the common roller to the retrieval-path side; and
    compliantly returning the trailing edge of each sheet of exposed film upward, so that the leading edge of that exposed sheet can engage the common roller on its retrieval-path side to be driven upward thereby.

11. The accessory of claim 6, further comprising:
    means for rotating the common roller; and
    sheet sensing means, responsive to positions of film sheets along the supply and retrieval paths, for actuating and deactuating the rotating means.

12. The accessory of claim 1, wherein the first and second drive means comprise in common:
    a pickup roller, an advance roller, and a feeder roller that, when rotating, always all rotate in the same, common, direction:

the pickup roller being disposed to start the leading edge of a single sheet of unexposed film out of the supply means into the supply path, and to propel the trailing edge of a single sheet of exposed film from the retrieval path into the receiving means, simultaneously;

the advance roller being disposed to continue driving of a single sheet of unexposed film along the supply path toward the focal-plane means, and to drive a single sheet of exposed film along the retrieval path toward the receiving means, simultaneously;

the feeder roller being disposed to propel the trailing edge of a single sheet of unexposed film from the supply path into the focal-plane means, and to start the leading edge of a single sheet of exposed film out of the focal-plane means into the retrieval path simultaneously.

13. The accessory of claim 12, further comprising:

first means for rotating the pickup and advance rollers;

second means for rotating the feeder roller;

manually operated means for initiating operation of both the first and second rotating means;

first sheet-position sensing means for halting operation of the first rotating means after a sheet has left the supply means;

second sheet-position sensing means for halting operation of the second rotating means after a sheet has been properly positioned in the focal-plane means.

14. An automatic sheet-feeding and -retrieving film-holder for use in a camera with a stack of photographic sheet film; said film-holder comprising:

supply means for holding a stack of sheets of unexposed film;

receiving means for holding a stack of sheets of exposed film;

focal-plane means for holding a single sheet of film in position for exposure by the camera;

both the supply means and the receiving means being disposed in common at one side of the focal-plane means;

first drive means for moving a sheet of such unexposed film from the supply means along a supply path to the focal-plane means; and second drive means for moving a sheet of such exposed film from the focal-plane means along a retrieval path to the receiving means;

wherein the first and second drive means have at least one common sheet-driving roller which feeds one sheet of unexposed film along the supply path and another sheet of exposed film along the retrieval path, simultaneously.

15. The film-holder of claim 14, wherein the first and second drive means have at least one common sheet-feeder roller that is:

mounted immediately adjacent to the focal-plane means;

disposed to drive the trailing edge of each unexposed sheet of film along the supply-path side of the sheet-feeder roller and into the focal-plane means, by rotation in a particular direction;

disposed to transfer the edge of each sheet of film that is held in the focal-plane means from the supply-path side of the sheet-feeder roller to the retrieval-path side of the sheet-feeder roller, by rotation in the same particular direction;

whereby said trailing edge becomes the leading edge of each sheet of exposed film; and disposed to start the leading edge of each sheet of exposed film along the retrieval-path side of the sheet-feeder roller, by rotation in said same particular direction.

16. The film-holder of claim 15, further comprising spring means disposed adjacent to the focal-plane means, for:

compliantly receiving the leading edge of each sheet of unexposed film toward the focal-plane means, so that the trailing edge of that unexposed sheet can clear the sheet-feeder roller while that trailing edge is being transferred from the supply-path side of the sheet-feeder roller to the retrieval-path side of the sheet-feeder roller; and compliantly returning the trailing edge of each sheet of exposed film away from the focal-plane means, so that the leading edge of that exposed sheet can engage the sheet-feeder roller on its retrieval-path side to be driven away from the focal-plane means thereby.

17. The film-holder of claim 14, further comprising:

means for rotating the common roller; and sheet sensing means, responsive to positions of film sheets along the supply and retrieval paths, for actuating and deactuating the rotating means.

18. The film-holder of claim 14, wherein the first and second drive means comprise, in common:

a pickup roller, an advance roller, and a feeder roller than, when rotating, always all rotate in the same, common, direction:

the pickup roller being disposed to start the leading edge of a single sheet of unexposed film out of the supply means into the supply path, and to propel the trailing edge of a single sheet of exposed film from the retrieval path into the receiving means, simultaneously;

the advance roller being disposed to continue driving of a single sheet of unexposed film along the supply path toward the focal-plane means, and to drive a single sheet of exposed film along the retrieval path toward the receiving means, simultaneously;

the feeder roller being disposed to propel the trailing edge of a single sheet of unexposed film from the supply path into the focal-plane means, and to start the leading edge of a single sheet of exposed film out of the focal-plane means into the retrieval path.

* * * * *